(12) United States Patent
Fu et al.

(10) Patent No.: US 10,459,971 B2
(45) Date of Patent: Oct. 29, 2019

(54) METHOD AND APPARATUS OF GENERATING IMAGE CHARACTERISTIC REPRESENTATION OF QUERY, AND IMAGE SEARCH METHOD AND APPARATUS

(71) Applicant: Baidu Online Network Technology (Beijing) Co., Ltd., Beijing (CN)

(72) Inventors: Libo Fu, Beijing (CN); Gaolin Fang, Beijing (CN); Yu Chen, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 311 days.

(21) Appl. No.: 15/281,209

(22) Filed: Sep. 30, 2016

(65) Prior Publication Data
US 2017/0329804 A1 Nov. 16, 2017

(30) Foreign Application Priority Data

May 10, 2016 (CN) .......................... 2016 1 0306218

(51) Int. Cl.
*G06F 7/00* (2006.01)
*G06F 16/58* (2019.01)
*G06K 9/62* (2006.01)

(52) U.S. Cl.
CPC ....... *G06F 16/5866* (2019.01); *G06K 9/6215* (2013.01); *G06K 9/6218* (2013.01);
(Continued)

(58) Field of Classification Search
CPC ......... G06F 17/30268; G06F 17/30994; G06F 17/30864; G06F 17/30696; G06F 17/30265; G06F 17/30247; G06F 17/30244; G06F 16/58; G06F 16/951; G06F 16/583; G06F 16/9535
See application file for complete search history.

(56) References Cited

U.S. PATENT DOCUMENTS 6,084,595 A * 7/2000 Bach ................... G06F 16/5838
345/589
6,563,959 B1 * 5/2003 Troyanker ......... G06K 9/00624
382/282
(Continued)

FOREIGN PATENT DOCUMENTS

CN 102930296 A 2/2013
CN 103294817 A 9/2013
(Continued)

*Primary Examiner* — Daniel A Kuddus
(74) *Attorney, Agent, or Firm* — Lathrop Gage LLP

(57) ABSTRACT

Embodiments of the present invention disclose a method and apparatus of generating an image characteristic representation of a query, and an image search method and apparatus. The method of generating an image characteristic representation of a query comprises: acquiring a clicked image set corresponding to a target query based on an image click log of a search user; generating image characteristic vectors corresponding to clicked images in the clicked image set based on image content characteristics of the clicked images; and clustering the clicked images based on the image characteristic vectors, and using a clustering result as an image characteristic representation of the target query.

19 Claims, 4 Drawing Sheets

(52) U.S. Cl.
CPC ......... *G06K 9/6221* (2013.01); *G06K 9/6256* (2013.01); *G06K 9/6267* (2013.01); *G06K 9/6269* (2013.01)

(56) References Cited

U.S. PATENT DOCUMENTS

| | | | | |
|---|---|---|---|---|
| 7,801,893 | B2* | 9/2010 | Gulli' | G06K 9/4652 707/737 |
| 8,325,465 | B2* | 12/2012 | Freeman | H01G 9/15 361/517 |
| 8,352,465 | B1* | 1/2013 | Jing | G06F 16/54 707/723 |
| 8,352,494 | B1* | 1/2013 | Badoiu | G06F 16/532 707/772 |
| 8,438,163 | B1* | 5/2013 | Li | G06K 9/00536 707/737 |
| 2007/0078846 | A1* | 4/2007 | Gulli | G06F 17/30247 |
| 2009/0163369 | A1* | 6/2009 | Treado | G06K 9/00147 506/8 |
| 2011/0237446 | A1* | 9/2011 | Treado | G06K 9/00147 506/8 |
| 2014/0032583 | A1* | 1/2014 | Ioffe | G06F 16/54 707/758 |
| 2015/0066957 | A1* | 3/2015 | Cevahir | G06F 16/24578 707/749 |
| 2015/0088923 | A1* | 3/2015 | Garcia-Barrio | G06F 17/30247 707/769 |
| 2015/0161129 | A1* | 6/2015 | Miller | G06F 16/40 707/728 |
| 2015/0169635 | A1* | 6/2015 | Jing | G06F 16/54 707/723 |
| 2015/0347505 | A1* | 12/2015 | Ohashi | G06F 19/321 707/754 |

FOREIGN PATENT DOCUMENTS

| | | |
|---|---|---|
| CN | 103744970 A | 4/2014 |
| CN | 104820718 A | 8/2015 |

* cited by examiner

METHOD AND APPARATUS OF GENERATING IMAGE CHARACTERISTIC REPRESENTATION OF QUERY, AND IMAGE SEARCH METHOD AND APPARATUS

CROSS REFERENCE TO RELATED APPLICATION

This application claims the priority of Chinese Patent Application No. 201610306218.9, entitled "Method and Apparatus of Generating Image Characteristic Representation of Query, and Image Search Method and Apparatus," filed on May 10, 2016, the content of which is incorporated herein by reference in its entirety.

TECHNICAL FIELD

Embodiments of the present invention relate to information processing technologies, and in particular, to a method and apparatus of generating an image characteristic representation of a query, and an image search method and apparatus.

BACKGROUND

Image search refers to an information retrieval process of entering a natural language query by a user, for example, a query entered via a text field provided by a search engine, searching an image set, and returning image results sorted by an index, such as correlation, to the user. The correlation, as one of the major performance indexes of a search engine, measures the degree of correlation between a returned result and the user's query requirements. Images returned by an image search engine are in a structureless pixel format, while queries entered by users are in a text format. These two information formats are completely different, and cannot be directly computed.

Currently, correlation characteristics of image search are described mainly by the following three approaches: 1. a text matching characteristic, whereby the correlation is obtained by comparative calculation on the surrounding text of an image and a query; 2. a classification matching characteristic, whereby the correlation is obtained by comparative calculation on a classification label and the query, and the classification label is obtained by classifying the image content; and 3. a click-through rate characteristic, whereby the correlation is a measure of correlation between a specific image and the query obtained by collecting statistics on click behaviors and the like of a large number of users after querying.

The above mentioned three methods of describing the correlation characteristics of image search all have some limitations:

For the characteristic text matching characteristic: the surrounding text of the image may be inconsistent with the image content, and cannot completely and accurately describe the content of the image in many cases. The accuracy of the text matching characteristic is therefore affected.

The classification matching characteristic is limited by the integrity of a categorizing system and the accuracy of a classification model. Generally, as the fineness of the categorizing system increases, classification becomes more difficult, and the classification model becomes less accurate. Moreover, a classification result is more semantically deviated from a query text, and matching becomes more difficult. However, if the category system is too rough, the matching with the query is not precise enough. Therefore, this characteristic generally only plays an auxiliary role.

The click-through rate characteristic is mainly based on statistics on user behaviors, has biases and noises on one hand, and sparsity on the other hand. Sufficient click statistics can be collected only from images presented at the front and presented for sufficient times under high-frequency queries, while in other cases, no click statistics can be collected, or clicks are very sparse and lack statistical significance.

SUMMARY

Accordingly, embodiments of the present invention provide a method and apparatus of generating an image characteristic representation of a query, and an image search method and apparatus, to optimize existing image search technologies, and improve correlation between an image search result and a query entered by a user.

In a first aspect, the embodiments of the present invention provide a method of generating an image characteristic representation of a query, comprising:

acquiring a clicked image set corresponding to a target query based on an image click log of a search user;

generating image characteristic vectors corresponding to clicked images in the clicked image set based on image content characteristics of the clicked images; and clustering the clicked images based on the image characteristic vectors, and using a clustering result as an image characteristic representation of the target query.

In a second aspect, the embodiments of the present invention further provide an image search method, comprising:

determining, based on a query entered by a user, an image characteristic representation corresponding to the query, the image characteristic representation corresponding to the query generated by clustering image characteristic vectors of images in a clicked image set corresponding to the query;

calculating correlation metric values between the query and to-be-sorted images based on the image characteristic representation; and sorting the to-be-sorted images based on the calculated correlation metric values, and providing the user with an image search result corresponding to a sorting result.

In a third aspect, the embodiments of the present invention provide an apparatus of generating an image characteristic representation of a query, including:

a clicked image set acquiring module, for acquiring a clicked image set corresponding to a target query based on an image click log of search users;

an image characteristic vector generating module, for generating image characteristic vectors corresponding to clicked images in the clicked image set based on image content characteristics of the clicked images; and an image characteristic representation generating module, for clustering the clicked images based on the image characteristic vectors, and using a clustering result as an image characteristic representation of the target query.

In a fourth aspect, the embodiments of the present invention further provide an image search apparatus, comprising:

an image characteristic representation determining module, configured to determine, based on a query entered by a user, an image characteristic representation corresponding to the query, the image characteristic representation corresponding to the query generated by clustering image characteristic vectors of images in a clicked image set corresponding to the query;

a correlation metric value calculating module, configured to calculate correlation metric values between the query and to-be-sorted images based on the image characteristic representation; and an image search result providing module, configured to sort the to-be-sorted images based on the calculated correlation metric values, and provide the user with an image search result corresponding to a sorting result.

According to the embodiments of the present invention, a clicked image set corresponding to the same target query is acquired based on an image click log of a search user, and image characteristic vectors corresponding to the clicked image set are generated. The clicked images are clustered on the basis of the image characteristic vectors, and the clustering result is used as an image characteristic representation of the target search query. After an image search engine receives an image query entered by a user, correlation metric values between to-be-sorted images and the image query can be calculated by determining an image characteristic representation corresponding to the image query. Further, the to-be-sorted images are sorted on the basis of the correlation metric values, and the sorting result is returned to the user. Therefore, the existing image search technology is optimized, and the correlation between an image search result and a query entered by a user can be significantly improved.

DETAILED DESCRIPTION OF PREFERRED EMBODIMENTS

Figure 1:
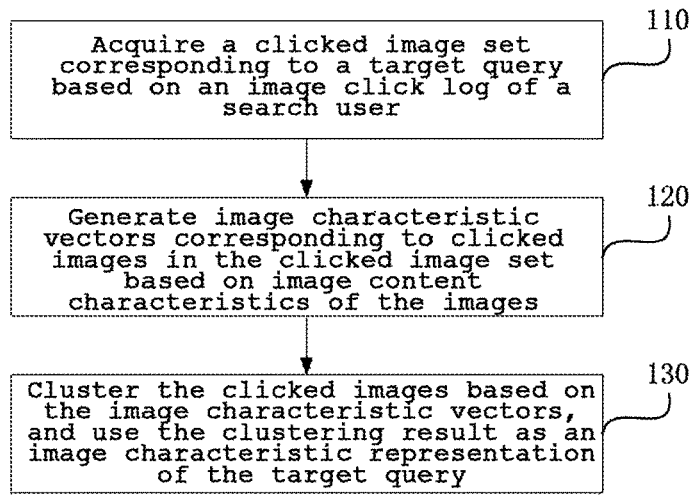
FIG. 1 is a flowchart of a method of generating an image characteristic representation of a query according to a first embodiment of the present invention.

To make objectives, technical solutions, and advantages of the present invention clearer, embodiments of the present invention will be described hereinafter in detail with reference to the accompanying drawings. It should be understood that, the embodiments described herein are merely used to illustrate the present invention rather than limiting the present invention.

In addition, it should further be noted that, for ease of description, only the related parts rather than all the content of the present invention are shown in the accompanying drawings. Before further discussing the exemplary embodiments in detail, it should be noted that, some exemplary embodiments are described as processes or methods that are depicted as flowcharts. Although the flowcharts describe the operations (or steps) as sequential processes, many of the operations can be performed in parallel, concurrently or simultaneously. In addition, the order of the operations can be rearranged. The process can be terminated when its operations are completed. However, the process may further involve additional steps not included in the accompanying drawings. The process may correspond to a method, a function, a routine, a subroutine, and the like.

To clearly describe the content of the embodiments of the present invention, the inventive concept of the present invention is emphatically described first.

As described above, in the three approaches of describing a correlation characteristic of an image search introduced in the background section, correlation between an image and a query is not calculated directly on the basis of image content; instead, the correlation between the image and the query is calculated based on characteristics indirectly associated with the content of the image, such as a peripheral text of the image, the class of the image, and the click-through rate of the image. In contrast, the inventor creatively proposes in the present application to create an image characteristic representation of a query, wherein the image characteristic representation comprises image characteristic vectors of images corresponding to a clicked image log of the query, and obtain, by calculating correlation between the image characteristic representation of the query and image characteristic vectors of to-be-sorted images, correlation metric values between the query and the images, thus achieving the purpose of accurately searching for images based on a query entered by a user.

In other words, the click-through rate (the number of clicks/the number of presentations) of an image corresponding to a query is positively correlated to the correlation between the image and the query. On this basis:

1) Clicked images corresponding to the query are clustered to obtain a representation of the query, wherein such representation has a same representation format as the image, and thus can be directly put into matching calculation with the image. This step can be implemented either offline or online.

2) In an online retrieval phase, matching calculation is performed on the representation obtained in the previous step and each to-be-sorted image corresponding to the query, to obtain a correlation metric value between the to-be-sorted image and the query in this representation, wherein the correlation metric value may be used as an one-dimensional characteristic of the correlation between the image and the query.

First Embodiment

FIG. 1 is a flowchart of a method of generating an image characteristic representation of a query according to a first embodiment of the present invention. The method of this embodiment may be performed by an apparatus of generating an image characteristic representation of a query. The apparatus may be implemented by hardware and/or software, and generally may be integrated in a server for generating an image characteristic representation of a query. The method of this embodiment specifically comprises the following steps:

110, acquire a clicked image set corresponding to a target query based on an image click log of a search user.

Generally, after entering a query via an image search engine, a user will click to view one or more images on the basis of an image search result corresponding to the query. Correspondingly, the search engine will store, in the image click log, the query entered by the user and information about the images clicked on the basis of the query.

By collecting image click logs of different users in a network and aggregating clicked images based on different queries, clicked image sets corresponding to target queries can be acquired.

The clicked image set comprises one or more images clicked by the user on the basis of the target query.

In this embodiment, the target query may comprise only a single query. Further, considering the sparsity of user clicks, unpopular queries that involve relatively few clicks or no clicks at all may share clicked images with other queries based on semantic similarities, and correspondingly, the target query may further comprise at least two queries meeting a preset similarity threshold condition.

In a specific example, "birthday card" may be directly selected as the target query, or "birthday card," "birthdate card" and "date-of-birth card" may be selected as the target query by an approach of semantic similarity clustering.

120, generate image characteristic vectors corresponding to clicked images in the clicked image set based on image content characteristics of the images.

Generally, different types of image characteristic vectors corresponding to images may be generated based on different image content characteristics of the images.

In this embodiment, the specific form of the image characteristic vector is not limited, as long as it is ensured that the distance (or, similarity) between any finally generated image characteristic vectors can be calculated.

In a specific example, on the basis of a low-level visual characteristic of an image, the generated image characteristic vector may be a color distribution histogram-based color distribution vector or a visual word distribution vector; and on the basis of a semantic characteristic of an image, the generated image characteristic vector may be a category distribution vector.

130, cluster the clicked images based on the image characteristic vectors, and using the clustering result as an image characteristic representation of the target query.

Considering that there may be a large number of clicked images corresponding to the same target query, if image characteristic vectors corresponding to all the clicked images are directly used as the image characteristic representation of the target query, the image characteristic representation would comprise tremendous information, which would further result in complex calculations during an image sorting process that is based on the image characteristic representation and deteriorate the real-time performance of sorting.

In this embodiment, although a user may click different images on the basis of the same target query, many images are correlated to a certain degree. In an example, on the basis of a clicked image set of a target query "Fan Bingbing", different users will click to view different images on the basis of the search result of the query. However, actual query requirements of the users are correlated to a certain degree. For example, some users have a requirement for clicking to view Fan Bingbing's film stills, and some users have a requirement for clicking to view Fan Bingbing's on-site photos.

Therefore, the clicked images may be clustered based on the image characteristic vectors. The image characteristic vectors corresponding to the clicked images in the clicked image set may be optimized in such a way that, for images in the same cluster set, merely one or few images in the cluster are used to represent all images in the cluster or a cluster comprising a relatively small number of elements is deleted as noise, so as to optimize the number of image characteristic vectors included in the image characteristic representation of the target query.

In this embodiment, different types of clustering algorithms may be employed based on different forms of the image characteristic vectors. Typically, a K-means clustering algorithm, a hierarchical clustering algorithm, or the like may be employed. A weighted clustering algorithm or a non-weighted clustering algorithm may be employed, which is not limited in this embodiment.

In a preferred implementation of this embodiment, the clustering algorithm may be a weighted clustering algorithm; and Correspondingly characteristic, the method may further comprise, before clustering the clicked images based on the image characteristic vectors, and using the clustering result as the image characteristic representation of the target query:

determining weight values of the clicked images based on weight parameters of the clicked images.

The weight parameter may be a click-through rate corresponding to the clicked image, image popularity corresponding to the clicked image, a quality characteristic parameter of the image, etc., which is not limited in this embodiment.

In this embodiment of the present invention, a set of clicked images corresponding to the same target search query is acquired based on the image click log of the search user, and image characteristic vectors corresponding to the clicked image set are generated. The clicked images are clustered on the basis of the image characteristic vectors, and the clustering result is used as an image characteristic representation of the target search query. After an image search engine receives an image query entered by a user, correlation metric values between to-be-sorted images and the image query can be calculated by determining an image characteristic representation corresponding to the image query. Further, the to-be-sorted images are sorted on the basis of the correlation metric values, and the sorting result is returned to the user. Therefore, the existing image search technology is optimized, and the correlation between an image search result and a query entered by a user can be significantly improved.

Second Embodiment

Figure 2:
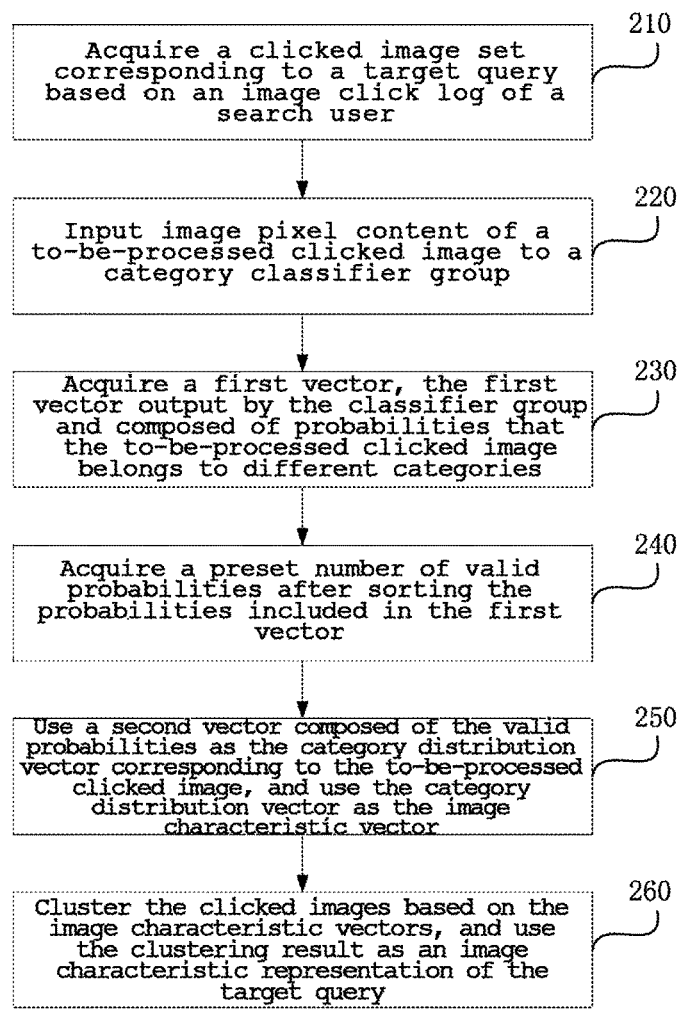
FIG. 2 is a flowchart of a method of generating an image characteristic representation of a query according to a second embodiment of the present invention.

FIG. 2 is a flowchart of a method of generating an image characteristic representation of a query according to a second embodiment of the present invention. This embodiment carries out optimazition on the basis of the foregoing embodiment. In this embodiment, the image characteristic vector is specifically optimized to be a category distribution vector.

Correspondingly, generating image characteristic vectors corresponding to clicked images in the clicked image set based on image content characteristics of the images is specifically optimized to be: inputting image pixel content of a to-be-processed clicked image to a category classifier group, wherein the category classifier group is generated by training with a preset amount of class-labeled training data; acquiring a first vector, the first vector output by the classifier group and composed of probabilities that the to-be-processed clicked image belongs to different categories; acquiring a preset number of valid probabilities after sorting the probabilities included in the first vector; and using a second vector composed of the valid probabilities, as the category distribution vector corresponding to the to-be-processed clicked image.

Correspondingly, the method of this embodiment specifically comprises the following steps:

210, acquire a clicked image set corresponding to a target query based on an image click log of a search user.

In this embodiment, acquiring the clicked image set corresponding to the target query based on the image click log of the search user specifically may further comprise: filtering out a noise log included in the image click log.

Such setting is carried out because there may be much noise in the image click log of the user. For example, a user is instead attracted to click some inappropriate images or malicious images that significantly contrast with related images, or such images are clicked in whatever queries. In some queries involving a lot of related results, the requirement of a user is already met after the user browses related images at the front, and probabilities of subsequent related images being clicked will significantly decrease. Such two behaviors will result in distortion of click/non-click, the number of clicks, and the correlations. Therefore, to further improve the accuracy of selected positive and negative sample images, the noise log included in the image click log needs to be filtered out.

Noise log recognition and removal are necessary operations for ensuring the accuracy of a trained model. Two methods are briefly introduced herein:

1) Click query clustering method: All queries (referred to as click queries below) in which an image (comprising repeated images and similar images) is clicked are gathered and clustered, and thus major requirement categories that the image meets can be obtained while minor categories can be regarded as noise and hence removed. All click queries far away from the major requirement categories can be considered as noise clicks.

2) Image clustering method: All clicked images corresponding to a query (comprising semantically identical and similar queries) are gathered, and classification results or class representations of these images are clustered; thus major image categories meeting the requirement of the query can be obtained while minor categories can be regarded as noise and hence removed.

220, input image pixel content of a to-be-processed clicked image to a category classifier group.

The category classifier group is generated by training with a preset amount of class-labeled training data.

In this embodiment, a relatively comprehensive and fine classification system, for example, more than a thousand categories, may be predefined, and sufficient training data is labeled in advance, to train a category classifier group. The input of the category classifier group is image pixel content, and the output of the category classifier group is a vector composed of probabilities that the image belongs to each category, namely, a category distribution vector of the image.

230, acquire a first vector, the first vector output by the classifier group and composed of probabilities that the to-be-processed clicked image belongs to different categories.

240, acquire a preset number of valid probabilities after sorting the probabilities included in the first vector.

250, use a second vector composed of the valid probabilities as the category distribution vector corresponding to the to-be-processed clicked image, and use the category distribution vector as the image characteristic vector.

In this embodiment, to reduce the vector length of the category distribution vector, the generated category distribution vector may be simplified, for example, only first R categories and probability values are reserved after sorting by probability, wherein R is an integer greater than 1.

260, cluster the clicked images based on the image characteristic vectors, and use the clustering result as an image characteristic representation of the target query.

In the technical solution of this embodiment, on the basis of semantic characteristics of images, category distribution vectors of the images are generated to serve as image characteristic vectors, and an image characteristic representation corresponding to a target query is generated on the basis of the category distribution vectors, so that the finally generated image characteristic representation is more relevant to the query, and thus an image characteristic representation-based image sorting result of a search engine can better meet actual requirements of a search user.

Third Embodiment

Figure 3:
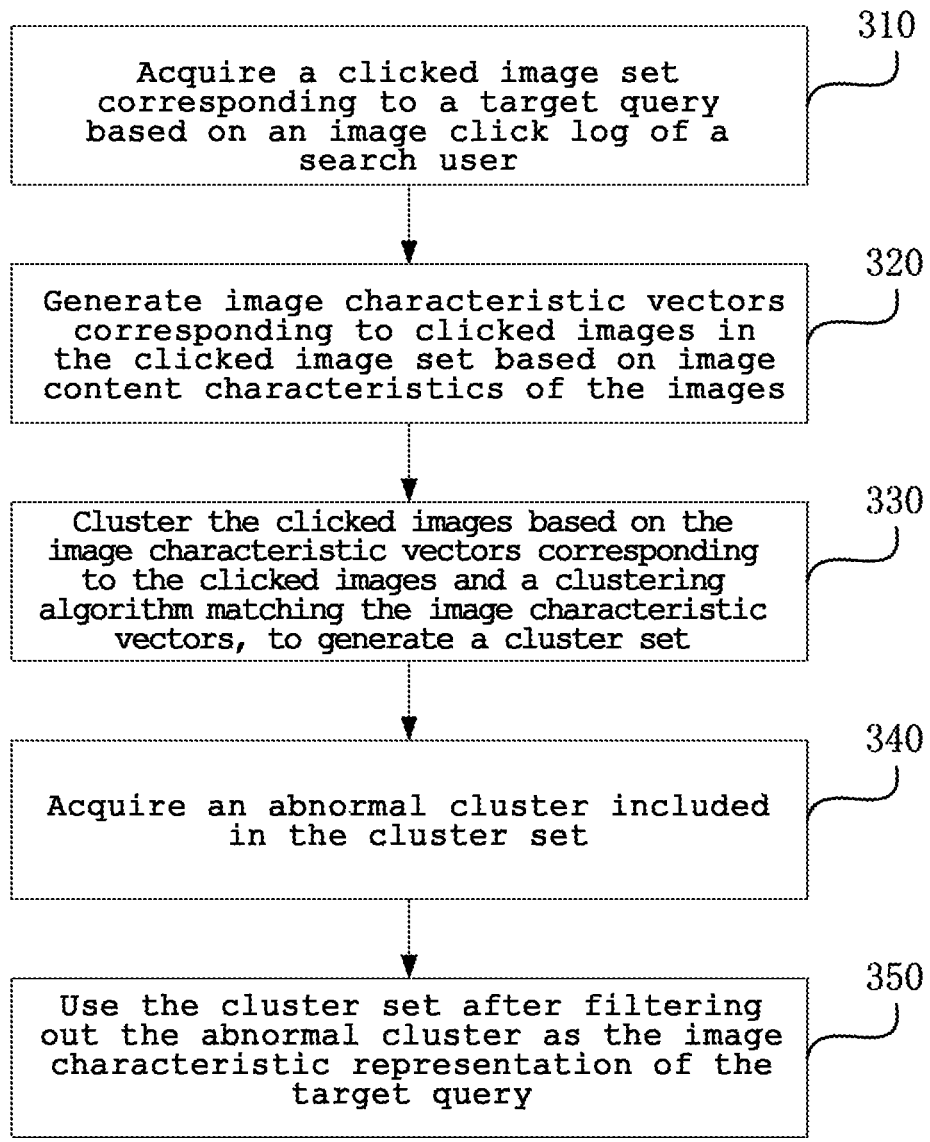
FIG. 3 is a flowchart of a method of generating an image characteristic representation of a query according to a third embodiment of the present invention.

FIG. 3 is a flowchart of a method of generating an image characteristic representation of a query according to a third embodiment of the present invention. This embodiment carries out optimization on the basis of the foregoing embodiments. In this embodiment, clustering the clicked images based on the image characteristic vectors, and using the clustering result as the image characteristic representation of the target query is specifically optimized to be: clustering the clicked images based on the image characteristic vectors corresponding to the clicked images and a clustering algorithm that matches the image characteristic vectors, to generate a cluster set; acquiring an abnormal cluster included in the cluster set; and using the cluster set, from which the abnormal cluster has been filtered out, as the image characteristic representation of the target query.

Correspondingly, the method of this embodiment specifically comprises the following steps:

310, acquire a clicked image set corresponding to a target query based on an image click log of a search user.

320, generate image characteristic vectors corresponding to clicked images in the clicked image set based on image content characteristics of the images.

330, cluster the clicked images based on the image characteristic vectors corresponding to the clicked images and a clustering algorithm matching the image characteristic vectors, to generate a cluster set.

In this embodiment, a clicked image set corresponding to a query q may be defined as $C_q=\{I_1^{cq}, I_2^{cq}, \ldots, I_m^{cq}\}$, wherein m is the total number of images included in the clicked image set, and m is an integer greater than or equal to one; a weight value $W_i$ is denoted for each image $I_i^{cq}, i \in [1,m]$, wherein $W_1$ may be denoted by using a click-through rate, and $f_i$ is used to denote the image characteristic vector of each image. Typically, the image characteristic vector $f_i$ is a fixed-length vector.

$f_i, i \in [1,m]$ are clustered by using a preset clustering algorithm, to generate a cluster set, wherein if the selected clustering algorithm is a weighted clustering algorithm, weighting processing needs to be performed on $f_i$ by using $W_i, i \in [1,m]$.

In a preferred implementation of this embodiment, each cluster in the cluster set specifically comprises: a mass center, the number of elements in the cluster, image characteristic vectors of the elements in the cluster, and the standard deviation of the elements in the cluster.

Based on the example above, it is assumed that $f_i, i \in [1,m]$ are finally clustered into N clusters, where N is an integer greater than one, the $k^{th}$ cluster $CL_k$ after clustering may be expressed as follows:

$CL_k=(f_k^c, n_k, \{f_{k1}, f_{k2}, \ldots, f_{kn_k}\}, \sigma_k), k=1, 2, \ldots, N;$ wherein $f_k^c$ is the mass center of the $k^{th}$ cluster (which may be a real mass center, or may be an image characteristic vector close to the real mass center), and $f_k^c$ has the same vector format as $f_i, i \in [1, m]$; $n_k$ is the number of elements included in the $k^{th}$ cluster; $\{f_{k1}, f_{k2}, \ldots, f_{kn_k}\}$ are the elements included in the $k^{th}$ cluster; and $\sigma_k$ is the standard deviation of the elements in the $k^{th}$ cluster, for measuring an aggregation degree of the elements in the cluster (another metric such as divergence may also be used to measure the aggregation degree of the elements).

In addition, distances such as Euclidean distances or cosine distances for calculating the mass center and the standard deviation (divergence) depend on the vector form of $f_i, i \in [1, m]$. The number N of clusters is determined by experiment.

340, acquire an abnormal cluster included in the cluster set.

In a preferred implementation of this embodiment, acquiring the abnormal cluster included in the cluster set may comprise:

acquiring a cluster not matching a class of the target query, as the abnormal cluster.

In another preferred implementation of this embodiment, acquiring the abnormal cluster included in the cluster set may comprise: sorting clusters in the cluster set based on the number of elements included in each cluster; and reserving a preset number of clusters as valid clusters based on the sorting result, and using a cluster other than the valid clusters in the cluster set as the abnormal cluster.

350, use the cluster set after filtering out the abnormal cluster as the image characteristic representation of the target query.

It should be noted that: the technical solution of this embodiment may be implemented either offline or online. If the technical solution is implemented offline, a corresponding image characteristic representation may be generated offline for each target query, and stored in the form of a key-value table (wherein typically, the target query is stored as the key, and the image characteristic representation is stored as the value), so as to be invoked during an online image search. If the technical solution is implemented online, when a user searches online, clicked images corresponding to a query currently entered by the user may be directly acquired and clustered online to generate a corresponding image characteristic representation.

In the technical solution of this embodiment, for any target query having a certain number of clicked images, an image characteristic representation corresponding to the target query can be obtained. This image characteristic representation has the same format as image characteristic vectors of the images, and thus can be directly put into matching calculation with the image characteristic vectors of the images. Secondly, the image characteristic representation is obtained on the basis of clicked image clustering, ensuring that the image characteristic representation not only can authentically reflect the actual requirements of the target query but also can desirably reflect the requirement diversity of the target query, and moreover, the image characteristic representation has a function of filtering out click noise to a certain degree.

In addition, it should be appreciated that differences between the embodiments of the present invention and the prior art include:

1) In the embodiments of the present invention, the generated image characteristic representation of the query is no longer limited by a text, so that the query has a representation with respect to image content, and can be directly put into matching calculation with the image content. This is an advantage compared with a text matching characteristic and a class matching characteristic.

2) In the embodiments of the present invention, the generated image characteristic representation of the query may be based on any image content characteristic. However, a classification result of class matching characteristics is not semantically precise when a category system for image classification is excessively small, while the classification accuracy is low and the difficulty of matching a text (or a category label) of the query increases dramatically (which is the so-called semantic gap between an image and a text) when the category system is excessively large. Compared with the class matching characteristic, the present invention avoids these problems.

3) In the embodiments of the present invention, the generated image characteristic representation of the query comes from clicked images corresponding to the query, and then can be put into matching calculation with any images, to generalize the correlation metric between images clicked by the user and the query to any images not clicked or sparsely clicked images. However, the click-through rate characteristic only applies to images with valid clicks in the query. This is an advantage of the present invention compared with the click-through rate characteristic.

In conclusion, the present invention has stronger capabilities regarding image characteristic representation of a query, matching between a query and image content, click generalization, and the like than the prior art as well as various integrations and variations, and more thoroughly solves the problem expected to be solved.

Fourth Embodiment

Figure 4:
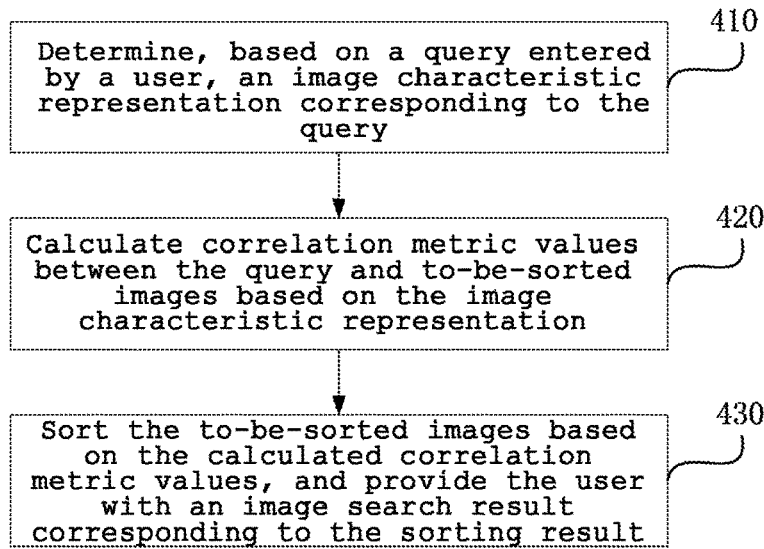
FIG. 4 is a flowchart of an image search method according to a fourth embodiment of the present invention.

FIG. 4 is a flowchart of an image search method according to a fourth embodiment of the present invention. The method of this embodiment may be performed by an image search apparatus. The apparatus may be implemented by hardware and/or software, and generally can be integrated in a server where an image search engine is located. The method of this embodiment specifically comprises the following steps:

410, determine, based on a query entered by a user, an image characteristic representation corresponding to the query.

In this embodiment, the query specifically refers to a text-form query entered by the user via an image search engine, for example, "birthday card."

The image characteristic representation corresponding to the query is generated by clustering image characteristic vectors of images in a clicked image set corresponding to the query.

In a preferred implementation of this embodiment, the image characteristic representation specifically comprises: a cluster set.

Each cluster in the cluster set specifically comprises: a mass center (which may be a real mass center, or may be an image characteristic vector close to the real mass center), the number of elements included in the cluster, image characteristic vectors of the elements in the cluster, and the standard deviation of the elements in the cluster.

Besides, the mass center has the same vector format as the image characteristic vectors of the elements in the cluster.

420, calculate correlation metric values between the query and to-be-sorted images based on the image characteristic representation.

The mass center of each cluster may be selected from the image characteristic representation, similarities between the selected mass center and image characteristic vectors corresponding to the to-be-sorted images are calculated, and correlation metric values between the query and the to-be-sorted images are determined based on the calculation result. Alternatively, a preset number of image characteristic vectors included in a preset number of clusters are selected from the image characteristic representation, similarities between the selected image characteristic vectors and the image characteristic vectors corresponding to the to-be-sorted images are calculated, and correlation metric values between the query and the to-be-sorted images are determined based on the calculation result, which is not limited in this embodiment.

430, sort the to-be-sorted images based on the calculated correlation metric values, and provide the user with an image search result corresponding to the sorting result.

In the technical solution of the present invention, after an image search engine receives an image query entered by a user, correlation metric values between to-be-sorted images and the image query can be calculated by determining an image characteristic representation corresponding to the image query; thus the to-be-sorted images are sorted on the basis of the correlation metric values, and the sorting result is returned to the user, which optimizes the existing image search technology, and can significantly improve correlation between an image search result and a query entered by a user.

Fifth Embodiment

Figure 5:
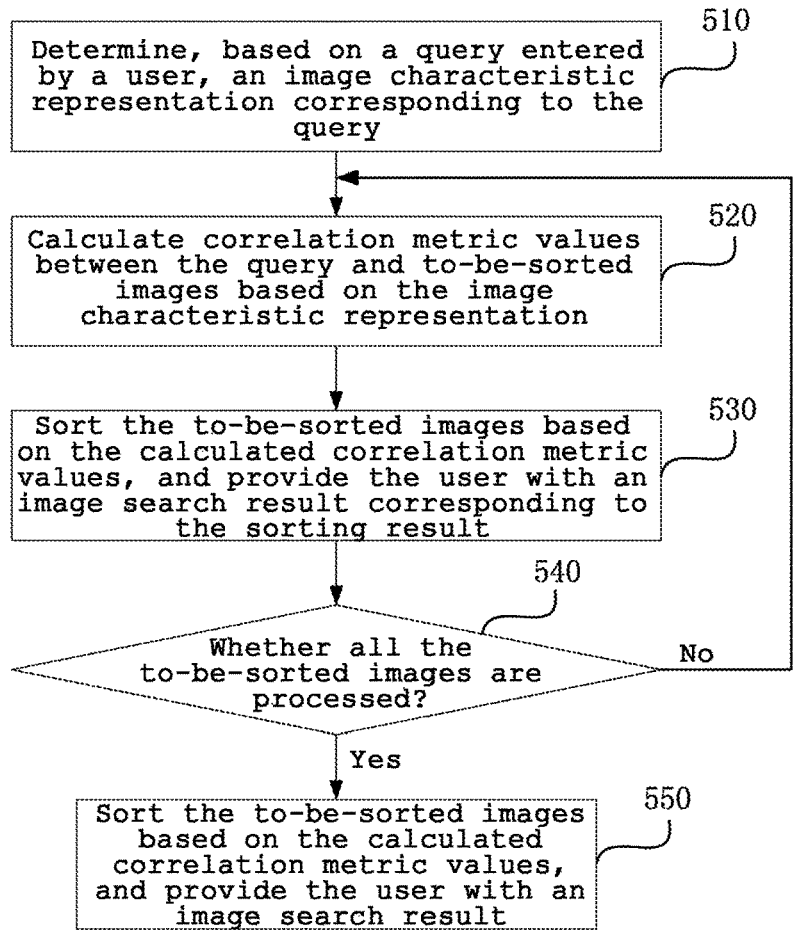
FIG. 5 is a flowchart of an image search method according to a fifth embodiment of the present invention.

FIG. 5 is a flowchart of an image search method according to a fifth embodiment of the present invention. This embodiment carries out optimization on the basis of the above embodiment. In this embodiment, calculating correlation metric values between the query and to-be-sorted images based on the image characteristic representation is specifically optimized to be: acquiring one to-be-sorted image sequentially as a current comparison image, and acquiring an image characteristic vector of the current comparison image as a to-be-compared vector, wherein the to-be-compared vector is of the same vector type and the same vector length as the image characteristic vectors of the elements included in the cluster; calculating similarities between the to-be-compared vector and the clusters in the cluster set, and using a calculated maximum similarity as a correlation metric value between the current comparison image and the query; and returning to execute the operation of acquiring one to-be-sorted image, till all the to-be-sorted images are processed.

Correspondingly, the method of this embodiment specifically comprises the following steps:

510, determine, based on a query entered by a user, an image characteristic representation corresponding to the query.

520, acquire one to-be-sorted image sequentially as a current comparison image, and acquiring an image characteristic vector of the current comparison image as a to-be-compared vector.

The to-be-compared vector is of the same vector type and the same vector length as the image characteristic vectors of the elements included in the cluster.

530, calculate similarities between the to-be-compared vector and the clusters in the cluster set, and use a calculated maximum similarity as a correlation metric value between the current comparison image and the query.

In a preferred implementation of this embodiment, calculating similarities between the to-be-compared vector and the clusters in the cluster set may specifically comprise:

calculating vector distances between the to-be-compared vector and the mass centers of the clusters in the cluster set, to serve as the similarities between the to-be-compared vector and the clusters in the cluster set.

In another preferred implementation of this embodiment, calculating similarities between the to-be-compared vector and the clusters in the cluster set may specifically comprise:

calculating vector distances between the to-be-compared vector and the mass centers of the clusters in the cluster set; and using results of dividing the calculated vector distances by the standard deviation of the clusters as the similarities between the to-be-compared vector and the clusters in the cluster set.

In a specific example, an image characteristic representation corresponding to a query q entered by a user is $Exp_q=\{CL_1, CL_2, \ldots, CL_K\}$, and $CL_i$, $i \in [1, K]$ represents the $i^{th}$ cluster:

$$CL_i = (f_i^c, n_i, \{f_{i1}, f_{i2}, \ldots, f_{in_i}\}, \sigma_i), i=1,2,\ldots,K;$$

wherein $f_i^c$ is the mass center of the $i^{th}$ cluster (which may be a real mass center, or may be an image characteristic vector close to the real mass center), $n_i$ is the number of elements included in the $i^{th}$ cluster; $\{f_{i1}, f_{i2}, \ldots, f_{in_i}\}$ are the elements included in the $i^{th}$ cluster, and $\sigma_i$ is the standard deviation of the elements in the $i^{th}$ cluster, for measuring an aggregation degree of the elements in the cluster (another metric such as divergence may also be used to measure the aggregation degree of the elements).

The above image characteristic representation $Exp_q$ indicates that the query q may have K types of valid requirements. As long as a to-be-sorted image meets any one of the requirements, the to-be-sorted image can be regarded as being relevant to the query q. Therefore, the correlation metric value Rel may be defined as follows:

$$Rel(q, f_j) = \max_i dist(f_j, f_i^c), i = 1, 2, \ldots, K;$$

wherein $f_j$ is an image characteristic vector of a to-be-sorted image, $f_i^c$ is a mass center of a cluster $CL_i$, and dist(,) is a distance definition, such as, an Euclidean distance or a cosine distance.

Considering different aggregation degrees of images in different clusters, in order to make correlation metric values Rel numerically comparable, the numerical value of Rel may be normalized by using the standard deviation or divergence of the cluster. An example of normalization using the standard deviation is shown as follows:

$$Rel_{norm}(q, f_j) = \max_i \frac{dist(f_j, f_i^c)}{\sigma_i}, i = 1, 2, \ldots, K.$$

540, determine whether all the to-be-sorted images are processed; if yes, performing 550; otherwise, returning to 520.

550, sort the to-be-sorted images based on the calculated correlation metric values, and providing the user with an image search result corresponding to the sorting result.

Experiments show that the technical solution of this embodiment significantly improves the correlation of the image search. Evaluations show that, after the image characteristic representation is added, in the image search, the search result satisfaction of random queries is increased by more than 15%, that is, a difference between the number of queries whose search results perceivably improve and the number of queries whose search results perceivably deteriorate accounts for over 15% of randomly sampled queries. The effect is very significant.

Sixth Embodiment

Figure 6:
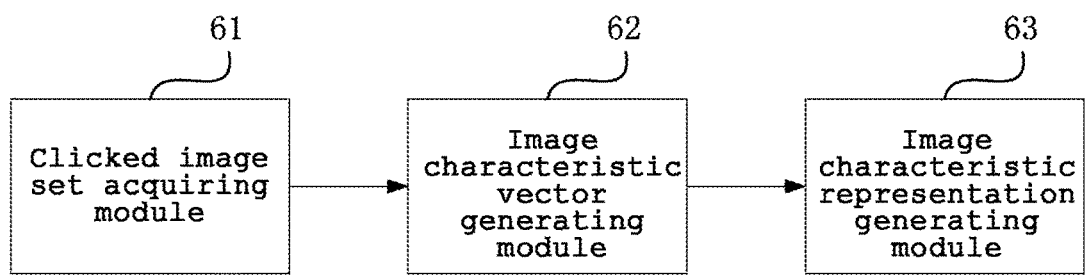
FIG. 6 is a structural diagram of an apparatus of generating an image characteristic representation of a query according to a sixth embodiment of the present invention.

FIG. 6 is a structural diagram of an apparatus of generating an image characteristic representation of a query according to a sixth embodiment of the present invention. As shown in FIG. 6, the apparatus comprises:

a clicked image set acquiring module 61, for acquiring a clicked image set corresponding to a target query based on an image click log of a search user;

an image characteristic vector generating module 62, for generating image characteristic vectors corresponding to clicked images in the clicked image set based on image content characteristics of the images; and an image characteristic representation generating module 63, for clustering the clicked images based on the image characteristic vectors, and using the clustering result as an image characteristic representation of the target query.

In this embodiment of the present invention, a set of clicked images corresponding to the same target search query is acquired based on the image click log of the search user, and image characteristic vectors corresponding to the clicked image set are generated. The clicked images are clustered on the basis of the image characteristic vectors, and the clustering result is used as an image characteristic representation of the target search query. After an image search engine receives an image query entered by a user, correlation metric values between to-be-sorted images and the image query can be calculated by determining an image characteristic representation corresponding to the image query. Further, the to-be-sorted images are sorted on the basis of the correlation metric values, and the sorting result is returned to the user. Therefore, the existing image search technology is optimized, and correlation between an image search result and a query entered by a user can be significantly improved.

Based on the above mentioned embodiments, the image characteristic vector may comprises: a category distribution vector, a color distribution histogram-based color distribution vector, or a visual word distribution vector.

Based on the above mentioned embodiments, the image characteristic vector generating module may be specifically configured to:

input image pixel content of a to-be-processed clicked image to a category classifier group, wherein the category classifier group is generated by training with a preset amount of class-labeled training data;

acquire a first vector, the first vector output by the classifier group and composed of probabilities that the to-be-processed clicked image belongs to different categories;

acquire a preset number of valid probabilities after sorting the probabilities included in the first vector; and use a second vector consisting of the valid probabilities as the category distribution vector corresponding to the to-be-processed clicked image.

Based on the above mentioned embodiments, the target query may specifically comprise: a single query or at least two queries meeting a preset similarity threshold condition.

Based on the above embodiments, the image characteristic representation generating module may specifically comprise:

a cluster set generating unit, for clustering the clicked images based on the image characteristic vectors corresponding to the clicked images and a clustering algorithm matching the image characteristic vectors, to generate a cluster set;

an abnormal cluster acquiring unit, for acquire an abnormal cluster included in the cluster set; and an image characteristic representation acquiring unit, for using the cluster set after filtering out the abnormal cluster as the image characteristic representation of the target query.

Based on the above mentioned embodiments, the abnormal cluster acquiring unit may be specifically configured to:

acquire a cluster not matching a class of the target query, as the abnormal cluster.

Based on the above mentioned embodiments, the abnormal cluster acquiring unit may be specifically configured to:

sort clusters in the cluster set based on the number of elements included in each cluster; and reserve a preset number of clusters as valid clusters based on the sorting result, and use a cluster other than the valid clusters in the cluster set as the abnormal cluster.

Based on the above mentioned embodiments, the clustering algorithm may be a weighted clustering algorithm; and correspondingly, the apparatus may further comprise: a weight value determining module, configured to: before the clicked images are clustered based on the image characteristic vectors and the clustering result is used as the image characteristic representation of the target query, determine weight values of the clicked images based on weight parameters of the clicked images, wherein the weight parameters comprise click-through rates corresponding to the clicked images.

Based on the above mentioned embodiments, each cluster in the cluster set may specifically comprise: amass center, the number of elements included in the cluster, image characteristic vectors of the elements in the cluster, and the standard deviation of the elements in the cluster.

The apparatus of generating an image characteristic representation of a query provided by this embodiment of the present invention can be used to perform the method of generating the image characteristic representation of the query provided by any embodiment of the present invention, and has corresponding functional modules to achieve the same beneficial effect.

Seventh Embodiment

Figure 7:
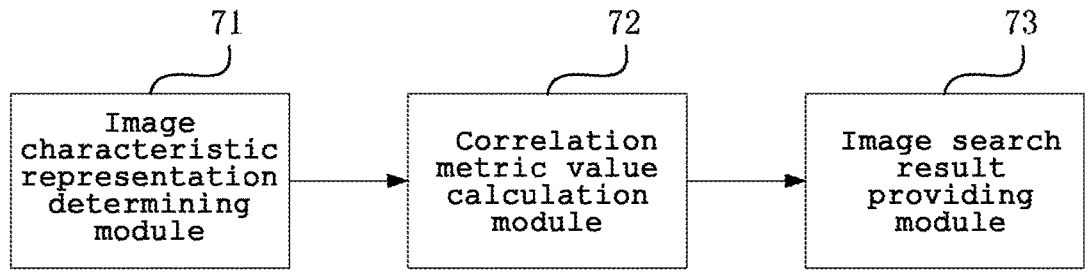
FIG. 7 is a structural diagram of an image search apparatus according to a seventh embodiment of the present invention.

FIG. 7 is a structural diagram of an image search apparatus according to a seventh embodiment of the present invention. As shown in FIG. 7, the apparatus comprises:

an image characteristic representation determining module 71, for determining, based on a query entered by a user, an image characteristic representation corresponding to the query, wherein the image characteristic representation corresponding to the query is generated by clustering image characteristic vectors of images in a clicked image set corresponding to the query;

a correlation metric value calculation module 72, for calculating correlation metric values between the query and to-be-sorted images based on the image characteristic representation; and an image search result providing module 73, for sorting the to-be-sorted images based on the calculated correlation metric values, and providing the user with an image search result corresponding to the sorting result.

In the technical solution of the present invention, after an image search engine receives an image query entered by a user, correlation metric values between to-be-sorted images and the image query can be calculated by determining an image characteristic representation corresponding to the image query; thus the to-be-sorted images are sorted on the basis of the correlation metric values, and the sorting result is returned to the user, which optimizes the existing image search technology, and can significantly improve correlation between an image search result and a query entered by a user.

Based on the above mentioned embodiments, the image characteristic representation may specifically comprise: a cluster set; and each cluster in the cluster set specifically comprises: a mass center, the number of elements included in the cluster, image characteristic vectors of the elements in the cluster, and the standard deviation of the elements in the cluster.

Based on the above embodiments, the correlation metric value calculation module may be specifically configured to:

acquire one to-be-sorted image sequentially as a current comparison image, and acquire an image characteristic vector of the current comparison image as a to-be-compared vector, wherein the to-be-compared vector is of the same vector type and the same vector length as the image characteristic vectors of the elements included in the cluster;

calculate similarities between the to-be-compared vector and the clusters in the cluster set, and use a calculated maximum similarity as a correlation metric value between the current comparison image and the query; and return to execute the operation of acquiring one to-be-sorted image, till all the to-be-sorted images are processed.

Based on the above mentioned embodiments, the correlation metric value calculation module specifically may be further configured to:

calculate vector distances between the to-be-compared vector and the mass centers of the clusters in the cluster set, to serve as the similarities between the to-be-compared vector and the clusters in the cluster set.

Based on the above mentioned embodiments, the correlation metric value calculation module specifically may be further configured to:

calculate vector distances between the to-be-compared vector and the mass centers of the clusters in the cluster set; and use results of dividing the calculated vector distances by a standard deviation of the clusters as the similarities between the to-be-compared vector and the clusters in the cluster set.

The image search apparatus provided by this embodiment of the present invention can be used to perform the image search method provided by any embodiment of the present invention, and has corresponding functional modules to achieve the same beneficial effect.

Naturally, those skilled in the art should understand that the foregoing modules or steps of the present invention may be implemented by a server as described above. Optionally, the embodiments of the present invention may be implemented by using a computer-executable program, and thus they can be stored in a storage device and executed by a processor. The above mentioned program may be stored in a computer readable storage medium, and the storage medium may be a read-only memory, a magnetic disk, an optical disc, or the like. Alternatively, the embodiments of the present invention are made into integrated circuit modules respectively, or multiple modules or steps of the embodiments are made into a single integrated circuit module for implementation. In this way, the present invention is not limited to any specific combination of hardware and software.

The above description describes merely preferred embodiments of the present invention, but is not intended to limit the present invention. Those skilled in the art may make various changes and modifications to the present invention. All modifications, equivalent replacements and improvements made within the spirit and principle of the present invention should fall within the protection scope of the present invention.

What is claimed is:

1. A method of generating an image characteristic representation of a text-based query, comprising:
    using a processor, acquiring a clicked image set corresponding to a text-based target query based on an image click log of a search user;
    using the processor, generating image characteristic vectors corresponding to clicked images in the clicked image set based on image content characteristics of the clicked images, wherein:
        each image characteristic vector comprises: a category distribution vector, a color distribution histogram-based color distribution vector, or a visual word distribution vector, and
        generating image characteristic vectors corresponding to clicked images in the clicked image set based on image content characteristics of the clicked images comprises inputting image-pixel content of a to-be-processed clicked image to a category classifier group, wherein the category classifier group is generated by training with a preset amount of class labeled training data; and
    using the processor, clustering the clicked images based on the image characteristic vectors, and using a clustering result as an image characteristic representation of the text-based target query.

2. The method according to claim 1, wherein the generating image characteristic vectors corresponding to clicked images in the clicked image set based on image content characteristics of the clicked images further comprises:
    acquiring a first vector, the first vector output by the category classifier group and composed of probabilities that the to-be-processed clicked image belongs to different categories;
    acquiring a preset number of valid probabilities after sorting the probabilities included in the first vector; and
    using a second vector composed of the valid probabilities as the category distribution vector corresponding to the to-be-processed clicked image.

3. The method according to claim 1, wherein the text-based target query comprises: a single query or at least two queries meeting a preset similarity threshold condition.

4. The method according to claim 1, wherein the clustering the clicked images based on the image characteristic vectors, and using the clustering result as the image characteristic representation of the text-based target query comprises:
    clustering the clicked images based on the image characteristic vectors corresponding to the clicked images and a clustering algorithm matching the image characteristic vectors, to generate a cluster set;
    acquiring an abnormal cluster included in the cluster set; and using the cluster set after filtering out the abnormal cluster as the image characteristic representation of the target query.

5. The method according to claim 4, wherein the acquiring the abnormal cluster included in the cluster set comprises:
acquiring a cluster not matching a class of the text-based target query as the abnormal cluster.

6. The method according to claim 4, wherein the acquiring the abnormal cluster included in the cluster set comprises:
sorting clusters in the cluster set based on a number of elements included in each cluster; and
reserving a preset number of clusters as valid clusters based on the sorting result, and using a cluster other than the valid clusters in the cluster set as the abnormal cluster.

7. The method according to claim 4, wherein the clustering algorithm is a weighted clustering algorithm, and the method further comprises, before the clustering the clicked images based on the image characteristic vectors, and using the clustering result as the image characteristic representation of the target query:
determining weight values of the clicked images based on weight parameters of the clicked images, the weight parameters comprising click-through rates corresponding to the clicked images.

8. The method according to claim 4, wherein each cluster in the cluster set comprises: a mass center, a number of elements included in the cluster, image characteristic vectors of the elements in the cluster, and a standard deviation of the elements in the cluster.

9. An image search method, comprising:
using a processor, determining, based on a text-based query entered by a user, an image characteristic representation corresponding to the text-based query, the image characteristic representation corresponding to the text-based query generated by clustering image characteristic vectors of images in a clicked image set corresponding to the text-based query, wherein:
each image characteristic vector comprises: a category distribution vector, a color distribution histogram-based color distribution vector, or a visual word distribution vector, and
the image characteristic vectors are generated by a process including inputting image-pixel content of a to-be-processed clicked image to a category classifier group, wherein the category classifier group is generated by training with a preset amount of class labeled training data;
using the processor, calculating correlation metric values between the text-based query and to-be-sorted images based on the image characteristic representation; and
using the processor, sorting the to-be-sorted images based on the calculated correlation metric values, and providing the user with an image search result corresponding to a sorting result.

10. The method according to claim 9, wherein the image characteristic representation comprises:
a cluster set, and
each cluster in the cluster set comprises: a mass center, a number of elements included in the cluster, image characteristic vectors of the elements in the cluster, and a standard deviation of the elements in the cluster.

11. The method according to claim 10, wherein the calculating the correlation metric values between the text-based query and the to-be-sorted images based on the image characteristic representation comprises:
acquiring one to-be-sorted image sequentially as a current comparison image, and acquiring an image characteristic vector of the current comparison image as a to-be-compared vector, wherein the to-be-compared vector is of a same vector type and a same vector length as image characteristic vectors of elements included in the cluster;
calculating similarities between the to-be-compared vector and the clusters in the cluster set, and using a calculated maximum similarity as a correlation metric value between the current comparison image and the text-based query; and
returning to execute the operation of acquiring one to-be-sorted image, till all the to-be-sorted images are processed.

12. The method according to claim 11, wherein the calculating similarities between the to-be-compared vector and the clusters in the cluster set comprises:
calculating vector distances between the to-be-compared vector and mass centers of the clusters in the cluster set, to serve as the similarities between the to-be-compared vector and the clusters in the cluster set.

13. The method according to claim 11, wherein the calculating similarities between the to-be-compared vector and the clusters in the cluster set comprises:
calculating vector distances between the to-be-compared vector and mass centers of the clusters in the cluster set; and
using results of dividing the calculated vector distances by a standard deviation of the clusters as the similarities between the to-be-compared vector and the clusters in the cluster set.

14. A system of generating an image characteristic representation of a query, comprising:
a hardware processor; and
a memory coupled to the processor and storing computer readable instructions which when executed by the processor, cause the processor to perform operations comprising:
acquiring a clicked image set corresponding to a text-based target query based on an image click log of a search user;
generating image characteristic vectors corresponding to clicked images in the clicked image set based on image content characteristics of the clicked images, wherein:
each image characteristic vector comprises: a category distribution vector, a color distribution histogram-based color distribution vector, or a visual word distribution vector, and
generating image characteristic vectors corresponding to clicked images in the clicked image set based on image content characteristics of the clicked images comprises inputting image-pixel content of a to-be-processed clicked image to a category classifier group, wherein the category classifier group is generated by training with a preset amount of class labeled training data; and
clustering the clicked images based on the image characteristic vectors, and using a clustering result as an image characteristic representation of the text-based target query.

15. The system according to claim 14, wherein the clustering the clicked images based on the image characteristic vectors, and using the clustering result as the image characteristic representation of the target query comprises:

clustering the clicked images based on the image characteristic vectors corresponding to the clicked images and a clustering algorithm matching the image characteristic vectors, to generate a cluster set;

acquiring an abnormal cluster included in the cluster set; and using the cluster set after filtering out the abnormal cluster as the image characteristic representation of the target query.

16. The system according to claim 15, wherein each cluster in the cluster set comprises: a mass center, a number of elements included in the cluster, image characteristic vectors of the elements in the cluster, and a standard deviation of the elements in the cluster.

17. A system, comprising:
a hardware processor; and
a memory coupled to the processor and storing computer readable instructions which when executed by the processor, cause the processor to perform operations comprising:
  determining, based on a text-based query entered by a user, an image characteristic representation corresponding to the text-based query, the image characteristic representation corresponding to the text-based query generated by clustering image characteristic vectors of images in a clicked image set corresponding to the text-based query, wherein:
    each image characteristic vector comprises: a category distribution vector, a color distribution histogram-based color distribution vector, or a visual word distribution vector, and
    the image characteristic vectors are generated by a process including inputting image-pixel content of a to-be-processed clicked image to a category classifier group, wherein the category classifier group is generated by training with a preset amount of class labeled training data;
  calculating correlation metric values between the text-based query and to-be-sorted images based on the image characteristic representation; and
  sorting the to-be-sorted images based on the calculated correlation metric values, and providing the user with an image search result corresponding to a sorting result.

18. The system according to claim 17, wherein the image characteristic representation comprises:
a cluster set, and
each cluster in the cluster set comprises: a mass center, a number of elements included in the cluster, image characteristic vectors of the elements in the cluster, and a standard deviation of the elements in the cluster.

19. The system according to claim 18, wherein the calculating the correlation metric values between the text-based query and the to-be-sorted images based on the image characteristic representation comprises:
  acquiring one to-be-sorted image sequentially as a current comparison image, and acquiring an image characteristic vector of the current comparison image as a to-be-compared vector, wherein the to-be-compared vector is of a same vector type and a same vector length as image characteristic vectors of elements included in the cluster;
  calculating similarities between the to-be-compared vector and the clusters in the cluster set, and using a calculated maximum similarity as a correlation metric value between the current comparison image and the text-based query; and
  returning to execute the operation of acquiring one to-be-sorted image, till all the to-be-sorted images are processed.

* * * * *